United States Patent
Kumar

(10) Patent No.: US 7,555,106 B2
(45) Date of Patent: Jun. 30, 2009

(54) SYSTEM AND METHOD FOR AUTOMATICALLY ASSIGNING AN EXTENSION NUMBER TO A TELEPHONE NUMBER TO ENABLE PRECISE, EFFICIENT AND SCALABLE TRACKING OF THE ORIGIN OF A TELEPHONE CALL FROM A PROSPECT TO AN ADVERTISER WITHIN A PERFORMANCE ADVERTISING MULTI-ADVERTISEMENT, MULTI-PUBLISHER FRAMEWORK

(76) Inventor: Gopesh Kumar, 573 Montevino Dr., Pleasanton, CA (US) 94566

( * ) Notice: Subject to any disclaimer, the term of this patent is extended or adjusted under 35 U.S.C. 154(b) by 737 days.

(21) Appl. No.: 11/164,718

(22) Filed: Dec. 2, 2005

(65) Prior Publication Data
US 2007/0250562 A1 Oct. 25, 2007

(51) Int. Cl.
H04M 15/00 (2006.01)
(52) U.S. Cl. .............. 379/114.13; 705/14; 705/40
(58) Field of Classification Search .......... 379/93.12, 379/93.13, 100.03, 100.12, 114.01, 114.13; 705/10, 14, 39, 40, 50
See application file for complete search history.

(56) References Cited

U.S. PATENT DOCUMENTS

| | | | | | |
|---|---|---|---|---|---|
| 4,850,007 A | * | 7/1989 | Marino et al. | ........... | 379/114.13 |
| 5,448,625 A | * | 9/1995 | Lederman | ............... | 379/88.25 |
| 5,903,635 A | * | 5/1999 | Kaplan | ................. | 379/112.01 |
| 5,937,390 A | * | 8/1999 | Hyodo | ....................... | 705/14 |
| 5,948,061 A | * | 9/1999 | Merriman et al. | .......... | 709/219 |
| 6,286,005 B1 | * | 9/2001 | Cannon | ..................... | 707/100 |
| 6,470,079 B1 | * | 10/2002 | Benson | ................. | 379/114.13 |
| 7,120,235 B2 | * | 10/2006 | Altberg et al. | ........ | 379/114.13 |
| 7,224,781 B2 | * | 5/2007 | Jacob et al. | ............ | 379/114.05 |
| 7,453,998 B2 | * | 11/2008 | Jacob et al. | ............ | 379/114.05 |
| 2003/0220866 A1 | * | 11/2003 | Pisaris-Henderson et al. | . | 705/37 |
| 2006/0190336 A1 | * | 8/2006 | Pisaris-Henderson et al. | . | 705/14 |

* cited by examiner

*Primary Examiner*—Binh K Tieu
(74) *Attorney, Agent, or Firm*—White-Welker & Welker, LLC

(57) ABSTRACT

A system and method for automatically dynamically creating an extension number associated to an assigned telephone number to enable precise, efficient and scalable tracking of the origin of a telephone call from a prospect to an advertiser within a voice communication-based performance advertising multi-advertisement, multi-publisher framework. The present invention remedies the shortcomings of the prior art by generating the extension number dynamically and automatically based on an algorithm that defines an advertiser account, individual advertisement and the publisher, thereby allowing a most efficient and scalable method for tracking calls in such a framework. This current invention can be utilized to bring the number of necessary assigned telephone numbers for a system containing 100 advertisers with 99 advertisements each, published by 99 different publishers from the 980,100 required in the old system to just 100 telephone numbers. And this efficiency is exponentially realized.

7 Claims, 5 Drawing Sheets

Internet-Based Interface Module for Advertisers For Creation of 'Single-Click' Telephone Call Advertisement

Figure 4

SYSTEM AND METHOD FOR AUTOMATICALLY ASSIGNING AN EXTENSION NUMBER TO A TELEPHONE NUMBER TO ENABLE PRECISE, EFFICIENT AND SCALABLE TRACKING OF THE ORIGIN OF A TELEPHONE CALL FROM A PROSPECT TO AN ADVERTISER WITHIN A PERFORMANCE ADVERTISING MULTI-ADVERTISEMENT, MULTI-PUBLISHER FRAMEWORK

FIELD OF THE INVENTION

The present invention relates to techniques for and the art of voice communication-based pay-for-performance advertising, and more specifically to the automatic assignment of an extension number to a telephone number provisioned for an advertiser that will identify both the particular advertisement from multiple advertisements under a single advertiser account, and the particular publishing entity that is publishing the advertisement. In so doing, it relates to the efficient distribution and tracking of voice communication-based advertisements.

DESCRIPTION OF PRIOR ART

Pay-for-performance advertising services have become very popular on the Internet. The most prevalent of such performance-based advertising is 'pay-per-click' or paid search, wherein advertisers pay only when prospects 'click through' their advertisements and onto the advertiser's website or other web presence. There is no cost to advertisers for the display of their advertisements (which is usually linked to a consumer search for a relevant or applicable keyword and/or category in a search engine), but only a cost if a prospect takes the desired action of choosing the advertisement and 'clicking through' it to the advertiser's Internet-based property.

Such 'pay-per-click' performance-based advertising has evolved from advertisements gathered in one entity's database being displayed only at that same single entity's own website domain, such as a search engine website, to advertisements gathered in one entity's database being displayed at a multiplicity of third-party publishers' website domains. The unique information-gathering capabilities of the Internet environment allows 'clicks' from an advertisement displayed at one publisher's website that directs a visitor to an advertiser's website to be easily discerned from 'clicks' from an identical advertisement displayed at a different publisher's website that directs the visitor to the same advertiser's website. This ability therefore makes it possible for the efficient distribution of these advertisements and, more importantly, the effective tracking of 'click' activity through these advertisements, and thus the precise, efficient measurement of advertisement performance, by advertisement and by publisher, throughout such a distributed environment.

One shortcoming of this kind of pay-for-performance advertising though is that it requires advertisers to have a website or web presence to which consumers can 'click through'. Many advertisers do not have a website. Furthermore, many advertisers sell goods and/or services that are not easily sold via the Internet and so, even if they did have a web presence, do not find it useful for a potential customer to 'click-through' to a website. Many of these advertisers instead find incoming phone calls more useful and valuable.

This 'pay-per-click' performance based advertising vehicle however is not designed to attract phone calls from prospects to advertisers, and is unable to track and log phone calls that may be ultimately generated as a result of these advertisements. Since this advertising system cannot definitively identify incoming calls to businesses that may have come from visitors who initially became aware of the advertiser through viewing such a 'pay-per-click' advertisement or 'clicking through' such an advertisement, it therefore lacks the ability to provide a pay-for-performance advertising model based on the performance, or action, many advertisers find truly useful and prefer: phone calls from potential customers.

More recently, there is a system available that offers advertisers an Internet-based pay-for-performance advertising model that utilizes the incoming phone call from a potential customer as the performance (and value) metric. It offers a method to monitor, track and charge advertisers for incoming phone calls from potential customers generated from Internet-based advertisements. This system assigns a unique phone number to an advertiser account and then displays this phone number in the Internet-based advertisement. When a viewer of the advertisement calls the assigned number, the call is routed through a central hub, where details of the call are tracked, and then out to the advertiser. In this way, pay-for-performance advertising based on the phone call as the value metric and billable action is realized.

Such a system however, has efficiency and scalability limitations, especially when dealing with a multiple advertisement-single account system, and an advertisement distribution business model. On one side, if an advertiser is assigned one unique telephone number for their account, and they create more than one advertisement in their account, then there is no way to discern from which advertisement the call was initiated if the same number is listed in multiple different advertisements. To avoid this problem, the old system must either limit an advertiser account to just one advertisement, or create a unique assigned number for each advertisement. The former option is inconvenient and restricting for advertisers, and the latter option is expensive and inefficient and ultimately unscalable, as each new assigned telephone line has a cost and there is a finite number of assigned numbers that can be created.

On the other side, if a single advertisement from a single advertiser with a single assigned phone number is distributed to and published by multiple publishers, there is no way to know at which publisher's site the prospect saw the advertisement and subsequently initiated a call. Again, to avoid this issue, the old system must either limit the number of publishers publishing any given advertisement to just one, or assign a unique telephone number for every unique publisher for each and every individual advertisement. The inconvenience, inefficiency and unscalability problems of both of these approaches apply to this side of the equation as well. In the old model, if just 100 advertisers create 99 advertisements each and the advertisements are published by 99 publishers, it would require the assignment of 980,100 telephone numbers to enable effective tracking of which advertisement and from which publisher calls were generated from. And the requirements just grow exponentially from here.

Consequently, there is a need for a more efficient system and method for tracking the call connection details of voice communication-based pay-for-performance advertising system that addresses these inherent efficiency and scalability issues of the old system. Such a system would make it easier, less expensive and more efficient to track exactly from which advertisements and from which publishers' properties that calls are initiated by prospects to advertisers, in such a multiple advertisement-single account and multiple publisher distribution model. Just such a system, with its inventive framework and its creative methods, is hereinafter described.

SUMMARY OF CURRENT INVENTION

It is the objective of the current invention to provide a system and method for automatically dynamically creating an extension number associated to an assigned telephone number to enable precise, efficient and scalable tracking of the origin of a telephone call from a prospect to an advertiser within a voice communication-based performance advertising multi-advertisement, multi-publisher framework. The present invention remedies the shortcomings of the prior art by generating the extension number dynamically and automatically based on an algorithm that defines an advertiser account, individual advertisement and the publisher, thereby allowing a most efficient and scalable method for tracking calls in such a framework. This current invention can be utilized to bring the number of necessary assigned telephone numbers for a system containing 100 advertisers with 99 advertisements each, published by 99 different publishers from the 980,100 required in the old system to just 100 telephone numbers. And this efficiency is exponentially realized.

DEFINITIONS

Activator Link (Single-Click Activator Link): a graphical or text icon that is linked to this system's database, embedded into this system's Advertisements, and empowered by a unique batch of computer code that enables the immediate telephonic contact between the Advertiser and the Prospect.

Advertisement: a unique design piece intended for distributed publication and display throughout the Internet for advertising purposes with the intention of encouraging consumers/prospects to take some consumer-related action as determined and desired by the Advertiser, in the case of the current invention, an incoming phone call. Advertisements could include banner ads, landing pages, popup windows, emails, directory listings, etc.

Advertiser (Client): a company or entity contracting and paying for the Advertisement.

Browser: a software program that runs on a client host and is used to request Web pages and other data from server hosts. This data can be downloaded to the client's disk or displayed on the screen by the browser.

Call Source URL: The web page, as identified by its Uniform Resource Locator (URL) address, from where a system-based telephone call is initiated by a prospect to an advertiser.

Client host: a computer that requests Web pages from server hosts, and generally communicates through a browser program.

Content provider: a person or business responsible for providing the information that makes up a collection of Web pages.

Distribution Channel: An avenue or vehicle for distributing something which, in the case of the current invention, are pay-per-telephone call Advertisements and are composed of Internet-based Publishers and service providers.

Distribution Partner (Publisher)(Channel): a company or entity who integrates and employs the current system within their Internet-based publication to distribute and/or publish the Advertisements through Internet-based media with the intention to drive phone calls from Prospects to Advertisers.

Embedded client software programs: software programs that comprise part of a Web site and that get downloaded into, and executed by, the browser.

Extension Number: A number associated with main telephone line that is entered after connecting through the main line, that routes a incoming call to a specific unique location.

Host: a computer that is connected to a network such as the Internet. Every host has a hostname (e.g., mypc.mycompany.com) and a numeric IP address (e.g., 123.104.35.12).

HTML (HyperText Markup Language): the language used to author Web Pages. In its raw form, HTML looks like normal text, interspersed with formatting commands. A browser's primary function is to read and render HTML.

HTTP (HyperText Transfer Protocol): protocol used between a browser and a Web server to exchange Web pages and other data over the Internet.

HyperText: text annotated with links to other Web pages (e.g., HTML).

IP (Internet Protocol): the communication protocol governing the Internet.

Server host: a computer on the Internet that hands out Web pages through a Web server program.

Phone Call Lead: an incoming call from a Prospect to an Advertiser through the system.

Phone-Link: a system-generated URL and sometimes icon that can be used to initiate, from the Internet, the connection of two parties over standard publicly-switched telephone lines.

Prospect: a potential customer of the Advertiser.

Publisher: a company or entity that publishes content or services for consumers and often generates revenue by publishing advertisements within, alongside or as part of said content.

Single-Click Activator Link: a graphical or text icon that is linked to this system's database, embedded into this system's Advertisements, and empowered by a unique batch of computer code that enables the immediate telephonic contact between the Advertiser and the Prospect.

URL (Uniform Resource Locator): the address of a Web component or other data. The URL identifies the protocol used to communicate with the server host, the IP address of the server host, and the location of the requested data on the server host. For example, "http://www.yellowpages.com/dentist.html" specifies an HTTP connection with the server host www.yellowpages.com, from which is requested the Web page (HTML file) dentist.html.

Visit: a series of requests to a fixed Web server by a single person (through a browser), occurring contiguously in time.

Voice Communication-Based Pay-for-Performance Advertising: Advertising for which advertisers are only charged when the advertising successfully performs its value-based objective. In this case, when a potential initiates contact with advertisers via a method that employs voice communication.

Web page: multimedia information on a Web site. A Web page is typically an HTML document comprising other Web components, such as images.

Web server: a software program running on a server host, for handing out Web pages.

Web site: a collection of Web pages residing on one or multiple server hosts and accessible through the same host or domain name (such as, for example, www.yellowpages.com).

BRIEF DESCRIPTION OF DRAWINGS

Without restricting the full scope of this invention, the preferred form of this invention is illustrated in the following drawings:

FIG. 4 displays the Advertiser's Ad Creation function page in the system's Internet-based advertiser interface that facilitates the creation of the unique provisioned telephone number and extension;

DETAILED DESCRIPTION

The following description is demonstrative in nature and is not intended to limit the scope of the invention or its application of uses.

There are a number of significant design features and improvements incorporated within the invention.

The present invention relates to techniques for and the art of voice communication-based pay-for-performance advertising, and more specifically to the automatic assignment and dynamic display of an extension number to a telephone number provisioned for an advertiser that will identify both the particular advertisement from multiple advertisements under a single advertiser account, and the particular publishing entity that is publishing the advertisement. In so doing, it relates to the efficient distribution and tracking of voice communication-based advertisements. The system improves on the prior art by dynamically and automatically assigning an extension number based on an algorithm that readily identifies the advertiser, advertisement and publisher, thereby minimizing the number of unique telephone numbers needed to be allocated to such an advertising system in order to track all the necessary details of call activity and so vastly improving the efficiency and scalability of such an advertising model.

Figure 1:
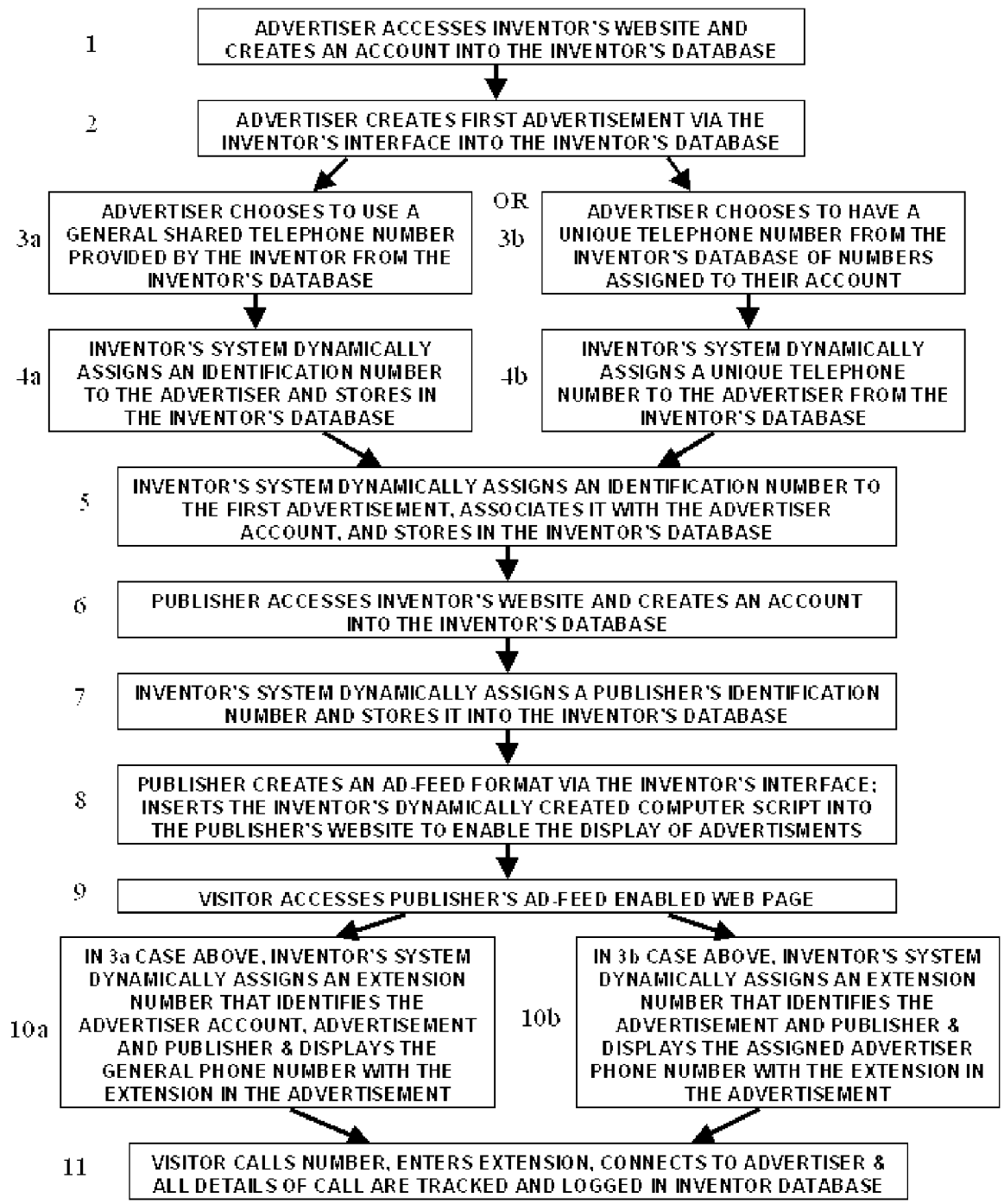
FIG. 1 shows a process flow of the system of the current invention
Figure 4:
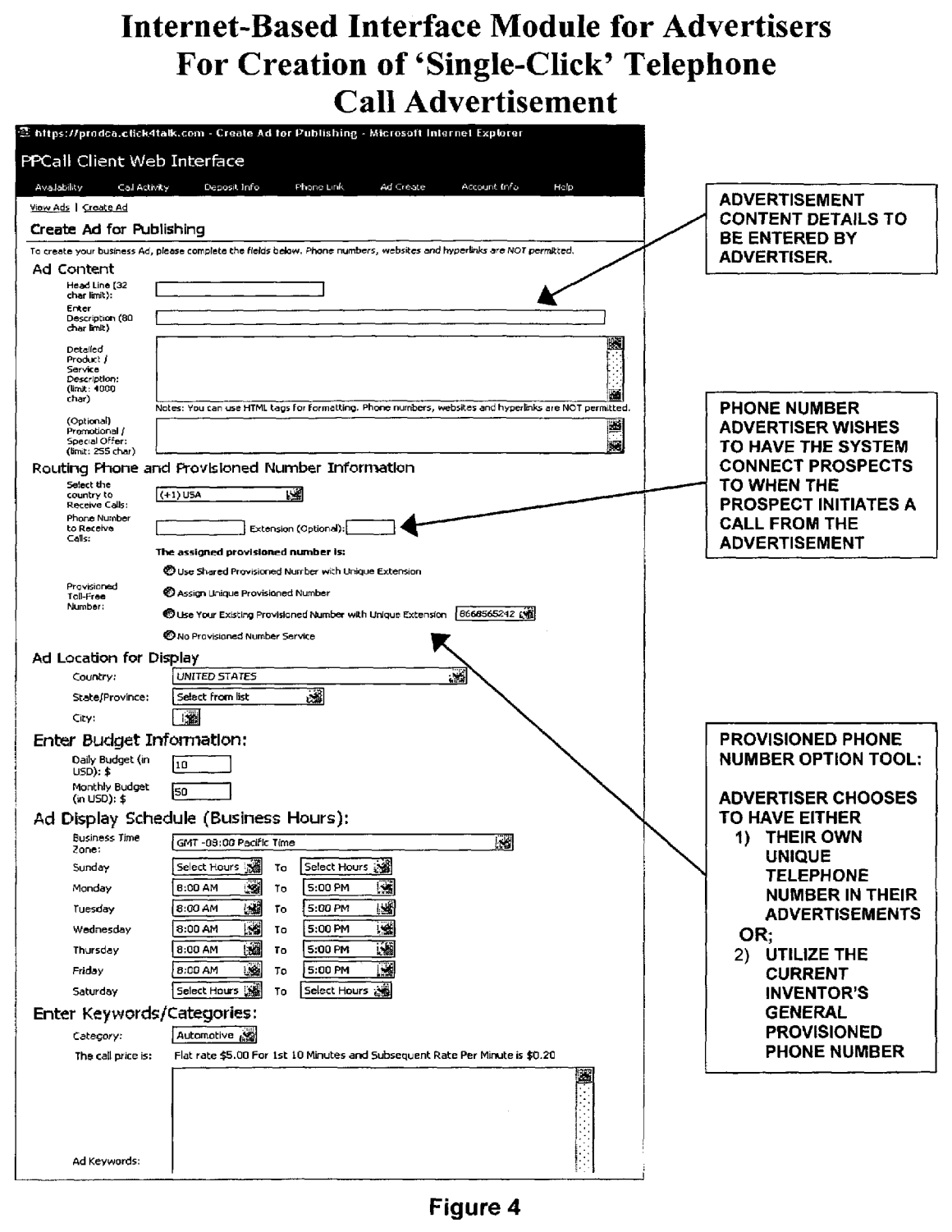
Figure 5:
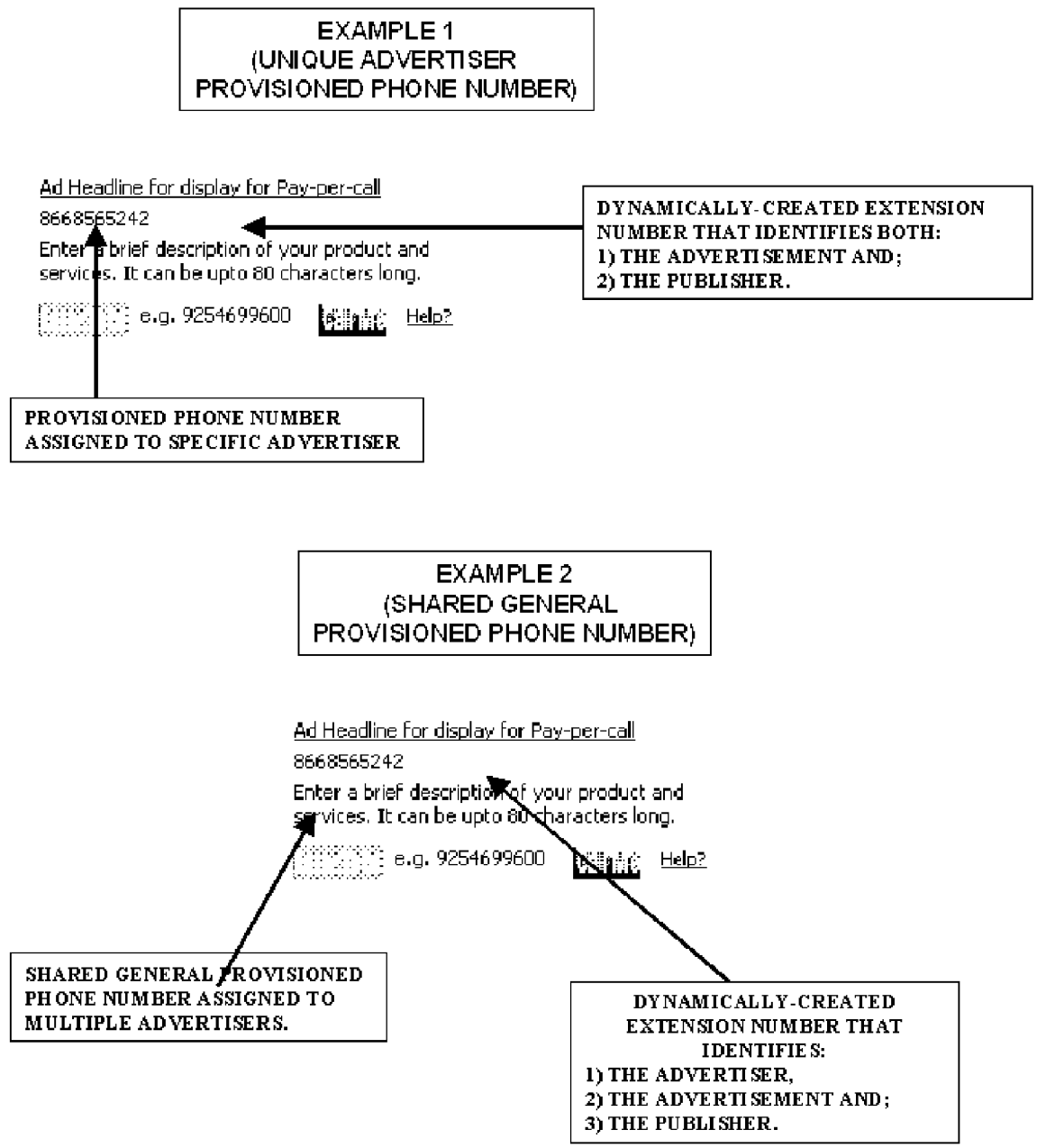
FIG. 5 shows examples of the Single-Click activator link enabled Advertisements displaying the provisioned telephone numbers and the automatically dynamically created extension numbers per the current invention.

FIG. 1 illustrates the process flow of the current invention. In one preferred embodiment of the invention, as an advertiser accesses the inventor's website and creates an account into the inventor's database and creates and advertisement (FIG. 4), the advertiser will be given a choice to use a general, shared telephone number for their advertisements or to have a unique advertiser-specific telephone number displayed in their advertisements (FIGS. 4 & 5). If the advertiser chooses to use the general shared telephone line, then the system will automatically assign and store in the inventor's database a numerical identifier for the advertiser account (FIG. 5). If the advertiser chooses to use their own unique telephone number for display in their advertisements, the system will automatically assign a telephone number from the collection of active telephone numbers stored in the inventor's database to the advertiser and store the details of this association in the inventor's database (FIG. 5).

In this preferred embodiment of the invention, when the advertiser creates an advertisement (FIG. 4), the system will automatically assign a numerical identifier to the advertisement and associate it in the inventor's database to the advertiser's account.

In this preferred embodiment of the invention, when the publisher accesses the inventor's website and creates an account into the inventor's database, the system will automatically assign a numerical identifier to the publisher and associate it in the inventor's database to the publisher's account.

In this preferred embodiment of the invention, when a prospect accesses a relevant publisher's web page that is enabled with the inventor's advertisement feed computer code, the system will serve the advertiser's advertisement (FIG. 5) from the inventor's database. The system will dynamically display in the advertisement, the advertiser's unique telephone number (or the general shared telephone number, depending on the choice made by the advertiser above) (FIG. 5).

In addition, in this preferred embodiment of the invention, the system will dynamically display, as an extension number after the telephone number, a combination of the numerical identifier for the advertisement and the numerical identifier for the publisher (and in the case of shared telephone number use, the numerical identifier for the advertiser, as well) (FIG. 5).

In this preferred embodiment of the invention, when a prospect calls the phone number displayed in the advertisement and enters the dynamically displayed extension number, the call will be routed to the advertiser. The call details will be captured in real-time in the inventor's database and displayed in the inventor web-based interface for the advertiser and publisher and will identify the advertiser, advertisement and publisher associated with the call (FIG. 6).

Figure 2:
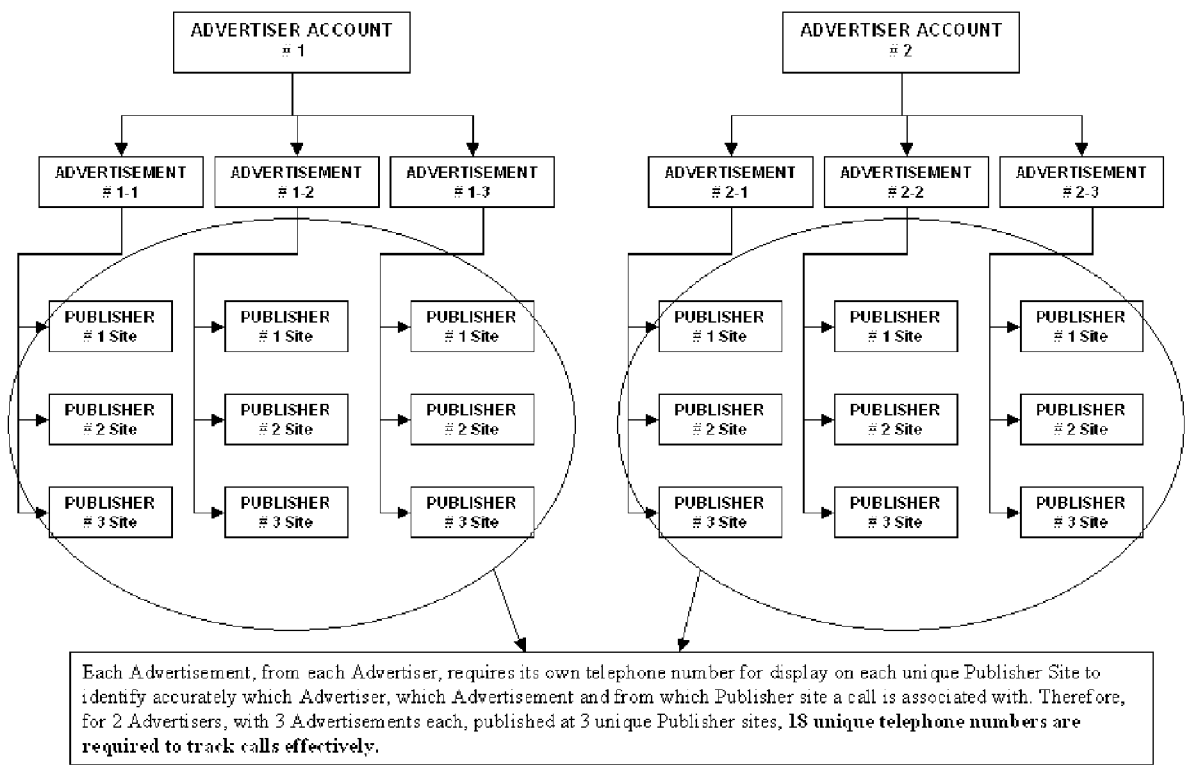
FIG. 2 shows the process of allocating and assigned provisioned phone numbers for the voice communication-based pay-for-performance advertising model as designed and dictated by the prior art.

This method of assignment and tracking in such a voice communication-based pay-for-performance advertising model will provide substantially more efficiency than the prior art and a scalability that would be unmanageable in the prior art's model FIG. 2 illustrates of the prior art of the telephone assignment process required for accurately tracking call activity through such an advertising model. The prior art's system and method for tracking required unique phone numbers for every advertisement and every publisher and therefore is inefficient and ultimately unscalable. As FIG. 2 shows, eighteen (18) unique phone numbers would be required utilizing the prior art to track accurately the call activity for two (2) advertisers, with three (3) advertisements each, being published on three (3) publisher sites.

Figure 3:
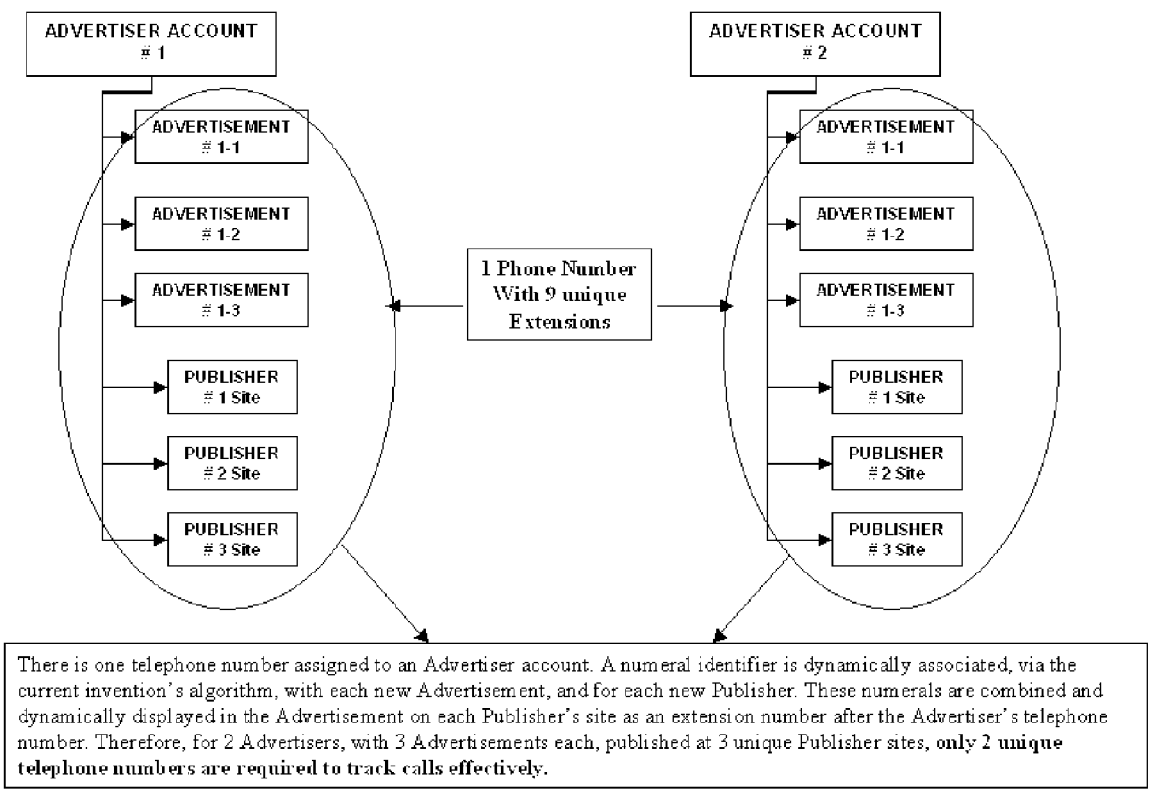
FIG. 3 shows the process of allocating and assigned provisioned phone numbers for the voice communication-based pay-for-performance advertising model as designed and dictated by the current invention.

FIG. 3 illustrates the art of the current invention telephone assignment for accurate tracking of call activity. In the same scenario as above, that is two (2) advertisers, with three (3) advertisements each, being published on three (3) publisher sites, the current invention requires only two (2) unique telephone numbers. Therefore, the current art represents a very significant improvement in efficiency and scalability for such telephone-based pay-for-performance advertising models.

The system is set to run on a computing device. A computing device on which the present invention can run would be comprised of a CPU, Hard Disk Drive, Keyboard, Monitor, CPU Main Memory and a portion of main memory where the system resides and executes. Any general-purpose computer with an appropriate amount of storage space is suitable for this purpose. Computer Devices like this are well known in the art and are not pertinent to the invention. The system is set to run on telecommunications sets. Telecommunications sets can include standard landline telephone sets utilizing the Publicly Switched Telephone Network (PSTN) or any variations thereof, any kind of cellular telephone set utilizing any cellular call processing technology, as well as any telecommunications sets utilizing Voice over Internet Protocol (VoIP) voice communications technology. Telecommunications sets like this are well known in the art and are not pertinent to the invention. The system can also be written in a number of different languages and run on a number of different operating systems and platforms.

Although the present invention has been described in considerable detail with reference to certain preferred versions thereof, other versions are possible. Therefore, the point and scope of the appended claims should not be limited to the description of the preferred versions contained herein.

As to a further discussion of the manner of usage and operation of the present invention, the same should be apparent from the above description. Accordingly, no further discussion relating to the manner of usage and operation will be provided.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A method of assigning an extension number to a telephone number in real time, the method comprising:
    assigning a unique telephone number to an advertiser account from a collection of active telephone numbers stored in a database as an advertiser creates an account and an advertisement and;
    associating the account, advertisement, and telephone number assignment details with one another and storing into the database and;
    assigning automatically and storing in the database a numerical identifier for the individual advertisement and associating it with the advertiser account within which it was created and the assigned telephone number associated with said advertiser and;
    assigning automatically and storing in the database a numerical identifier to a publisher account as a publisher creates an account into the database and;
    displaying dynamically in an Internet-based advertisement served by the inventor and published by the publisher at the publisher's website the telephone number assigned to the advertiser and;
    displaying dynamically as an extension number after the telephone number a combination of the numerical identifier of the individual advertisement and the numerical identifier of the publisher and;
    connecting by telephone prospects who call the assigned telephone number and enter the displayed extension number to the advertiser and;
    identifying and tracking such calls by the advertiser, advertisement and the publisher thereby;
    allowing accurate charges to the advertiser account per advertisement and accurate measurement of the tally of calls generated by a unique publisher's publication of the advertisement.

2. The method as described in claim 1, further including an Internet-based interface to facilitate the advertiser account establishment, the advertisement creation, and the associations of the telephone number, the numerical identifier of the advertisement and the numerical identifier of the publisher.

3. The method as described in claim 2, further comprising prompting the advertiser to enter the preferred telephone number to which the advertiser wishes to receive incoming telephone calls from prospects.

4. The method as described in claim 3, further comprising storing the preferred telephone number in a computer database.

5. The method as described in claim 1, further comprising the option to the advertiser to utilize their own unique assigned telephone number or to utilize a general shared telephone number provided by the inventor that multiple other advertisers may also utilize for their advertisements.

6. The method as described in claim 5, further comprising if the advertiser chooses the shared telephone number, then to automatically assign a numerical identifier to the advertiser and store in the database.

7. The method as described in claim 6, further comprising the dynamic display of the assigned advertiser numerical identifier as part of the extension number.

* * * * *